United States Patent [19]

Stepan

[11] 3,760,329

[45] Sept. 18, 1973

[54] MATED CONNECTOR APPARATUS FOR PRINTED WIRING BOARDS

[75] Inventor: William E. Stepan, Brookfield, Ill.

[73] Assignee: GTE Automatic Electric Laboratories Incorporated, Northlake, Ill.

[22] Filed: Aug. 3, 1972

[21] Appl. No.: 277,712

[52] U.S. Cl. .......... 339/18 C, 339/17 R, 339/126 J, 339/177 R, 339/181, 339/256 R

[51] Int. Cl. .......... H01r 29/00

[58] Field of Search .......... 339/17 R, 17 M, 17 C, 339/14 R, 14 P, 18 R, 18 P, 18 C, 18 B, 19, 64 R, 64 M, 65, 66, 94 C, 126 J, 150 T, 177, 181–183, 198, 217, 219, 252, 256, 258, 277

[56] References Cited

UNITED STATES PATENTS

| | | | |
|---|---|---|---|
| 3,405,384 | 10/1968 | Fuich | 339/19 X |
| 3,223,956 | 12/1965 | Dufendach et al. | 339/18 C X |
| 3,045,202 | 7/1962 | Shapiro | 339/177 R X |
| 3,091,748 | 5/1963 | Takes | 339/65 |
| 3,423,716 | 1/1969 | Deakin | 339/18 B |
| 3,145,329 | 8/1964 | Deakin et al. | 339/183 X |
| 3,088,089 | 4/1963 | Gregorie | 339/64 R X |
| 681,868 | 9/1901 | Bowen | 339/18 |

*Primary Examiner*—Marvin A. Champion
*Assistant Examiner*—Terrell P. Lewis
*Attorney*—K. Mullerheim et al.

[57] ABSTRACT

A single thickness double-sided pinboard card substrate such as a printed wiring board utilizes novel mated connector apparatus to interconnect circuit paths through pre-drilled openings through the board. The mated connector apparatus are miniaturized and are programmable to permit a desired selection of electrical connections. The mated connector apparatus are comprised of socket means pluggably mounted within the apertures and pluggable connectors means then to be removably mounted within the socket means. The pluggable connector means are useful for mounting discrete electrical components therein for interconnection between the oppositely disposed circuit paths.

10 Claims, 6 Drawing Figures

PATENTED SEP 18 1973

3,760,329

MATED CONNECTOR APPARATUS FOR PRINTED WIRING BOARDS

BACKGROUND

This invention relates generally to programmable printed wiring boards, and more particularly, relates to mated connector apparatus for use in making selective electrical connections between conductors disposed on opposite surfaces thereof.

In telephony switching applications, it has been common practice to provide crosspoint matrices through the use of matrix pinboards having x and y coordinate conductor strips selectively interconnected at the crosspoints therebetween by elongated shorting or diode type pin terminals. Generally, the matrix pinboards are multilayer pinboard matrix connector blocks such as those disclosed in U.S. Pat. Nos. 2,967,285, 3,170,745, 3,226,802 and 3,350,676. Such matrix pinboards have proven very useful in a large variety of applications requiring changeable programming through patching, namely, digital memories, sequencing devices, data processing systems, automated process control, analog function generators, instrumentation, and input-output switching into which category telephone switching using crosspoint matrices would apply. In many programming applications, more than two conductors are to be interconnected at a single connection, but in telephone crosspoint switching it is customary to have only two conductor strips or paths to be connected such as *x* to *y* or horizontal to vertical contact strips. In this application, it now appears desirable to provide a more economical, more direct and a miniaturized connection scheme for providing an interconnected two layered crosspoint matrix.

Heretofore, a given matrix pinboard has provided a selected array size of *x* and *y* contact strips to comprise a basic building block in forming larger array sizes. Some limitation is thus realized in selecting a fixed size array, for example, an $11 \times 20$ array can only be used to construct larger arrays that are multiples of the basic array. Also, it is apparent that such larger array sizes can accommodate other patchable combinations of crosspoint connections. Since in some applications the versatility of programming through patching to obtain different combinations of crosspoint connections is not required, it would seem to be more economical to provide in each instance for only the primary connection pattern desired. Desirably, the number of available crosspoints could be reduced to only those actually utilized and some hardware reduction realized. In telephone main frame equipment racks, relatively flat card substrates are slidably received within slots of a card file and are used to comprise the basic mounting surfaces for these matrix pinboards. Because of the excessive combined height of the matrix pinboards and their pin terminals, the cards must be adequately spaced from each other to permit clearance thus resulting in several vacant slots appearing between adjacent card substrates. It is more desirable to provide utilization of each adjacent card slot so that the number of card files and equipment racks are reduced.

Hence, in those switching applications or otherwise where the use of only two spaced conductor matrices are contemplated, it is proposed to support the various conductor matrices on the opposite flat surfaces of the card substrate and interconnect the same where desired through the thickness dimension of the card substrate. This hardware arrangement would present a programmable printed wiring board. The electric connections between spaced contact strips could be provided by direct connection of components as well as by various connectors, but it is desired to provide connector apparatus which could serve as either shorting or element-mounting pin terminals, which are pluggable to permit some degree of re-programming and replacement and which are miniaturized to permit closely spaced mounting of the card substrates. It is the feature of the invention to provide these advantages through the novel design of a mated connector apparatus as described hereinafter.

SUMMARY

It is therefore an object of the present invention to provide mated connector apparatus comprising programmable pin terminals for use with a single thickness substrate such as a printed wiring board.

In a file of double-sized pinboard matrix cards comprising printed wiring boards and stacked in closely adjacent side by side arrays, a given pinboard matrix card includes first and second sets of circuit paths disposed on the opposite sides thereof, a plurality of apertures extending through the thickness dimensions of the pinboard matrix card and a plurality of mated connector apparatus mountable in selected ones of the apertures to provide means for electrically connecting the first and second set of circuit paths through the mated connector apparatus. Each mated connector apparatus comprises socket means mountable in the aperture and pluggable connector means mountable in the socket means. The socket means include at least a pair of coaxial conductor sleeves having an inner sleeve to be extended through the thickness dimension of the pinboard matrix card for electrically engaging a selected circuit path of the first set of circuit paths and having an outer sleeve for engaging an oppositely disposed circuit path of the second set of circuit paths, the outer and inner sleeves being electrically insulated from each other. The pluggable connector means include at least a pair of coaxial conductors having an inner conductor to be inserted within the inner sleeve of the socket means for being electrically connected with the selected circuit path of the first set of circuit paths, and an outer conductor engageable with the outer sleeve of the socket means for electrically connecting with the selected circuit path of the second set of circuit paths, the inner and outer conductors being electrically engaged for completing an electrical connection at the aperture.

Other objects and advantages of the invention will naturally occur to those skilled in the pertinent art as the invention is described in connection with the accompanying drawing in which:

THE DRAWING

DETAILED DESCRIPTION

Figures 1, 1A, 2, 3, 4, 5:
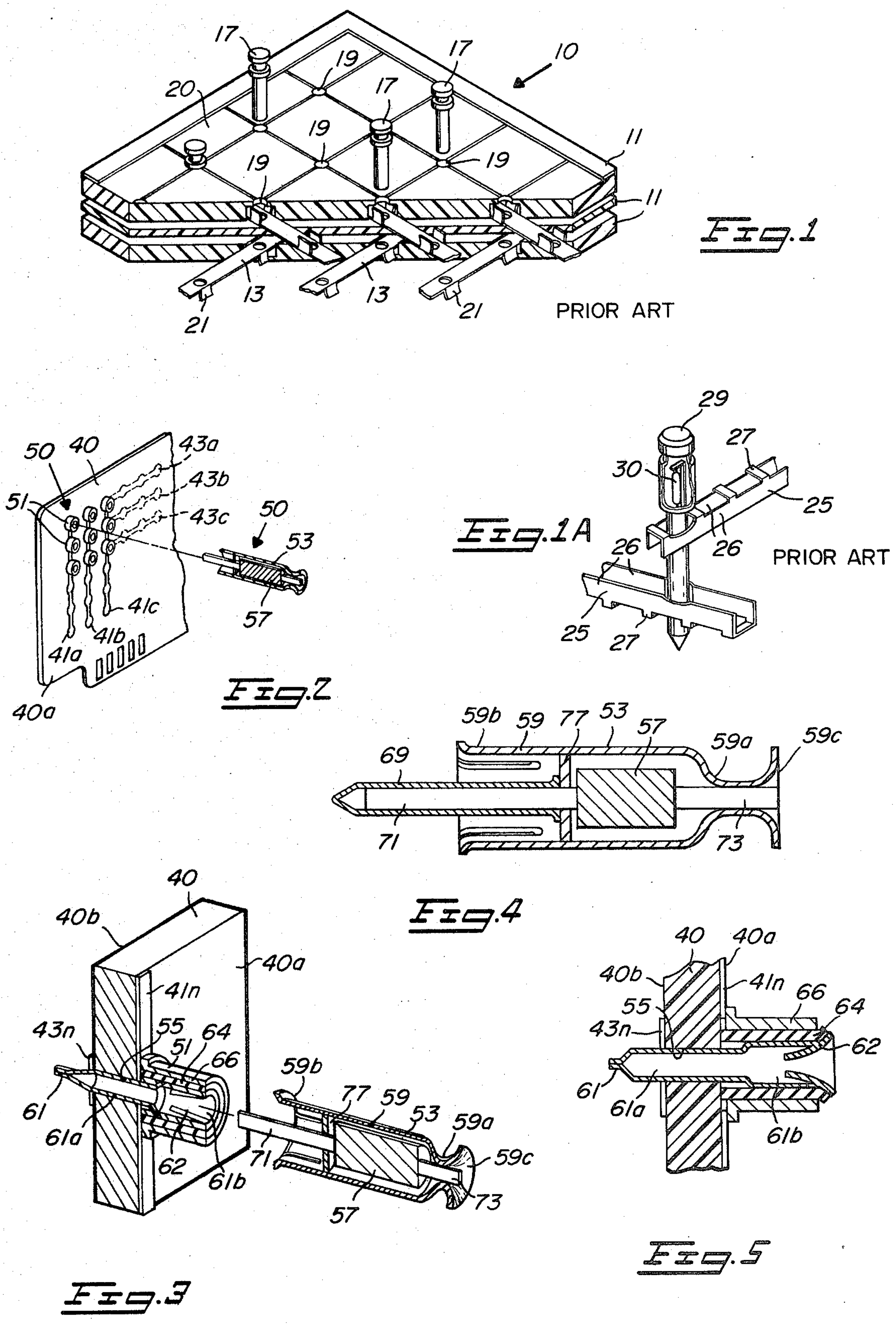
FIG. 1 is a frontal perspective view of a prior art multilayer pinboard matrix assembly showing *x* and *y* coordinate crosspatterns of electrical contact strips and showing pin terminals used for connecting the contact strips at their crosspoints.
FIG. 1A is an isolated perspective view of a pair of spaced conductor fragments forming a crosspoint and being interconnected at the crosspoint by a diode-type pin terminal of the prior art.
FIG. 2 is a perspective view of a portion of a printed wiring board substrate showing connector apparatus of the present invention in an unmated condition.
FIG. 3 is a sectional enlarged perspective view of the connector apparatus of FIG. 2 showing the manner of assembly therefor and the mounting attachment to the printed wiring board substrate.
FIG. 4 is a sectional enlarged side plan view of the removed pluggable portion of the connector apparatus.
FIG. 5 is a sectional enlarged side plan view of the socket portion of the connector apparatus.

FIG. 1 shows the commonly known sandwich construction of a programmable multilayer pinboard matrix assembly 10 having a plurality of superposed honeycombed phenolic or epoxy-glass blocks or substrate layers 11 spaced apart with respect to their adjacent surfaces. Parallel spaced matrices of conductor paths or contact strips 13 are supported in the spaces between the blocks 11 with alternate matrices arranged to extend crosswise of each other to comprise the well understood *x* and *y* or horizontal and vertical coordinate crosspattern. Multiple crosspoints are defined between layered contact strips 13 as shown in FIG. 1, and are conveniently interconnected at the crosspoints by either shorting or diode-type pin terminals, a shorting type pin terminal being used at 17. The pin terminals are pluggable into pre-drilled openings or apertures 19 in the upper face 20 of the topmost block 11 with reference to FIG. 1. Similar openings are provided in the underlying structure of both phenolic blocks and contact strips to comprise a pre-formed channel for receiving the inserted pin terminals 17. The contact strips 13 are provided with pairs of inwardly directed jaw members 21 at the openings intended to receive the extension of pin terminals 17 for providing firm electrical connections between the contact strips 13 and the pins 17. Of course, the jaw members 21 are only one means for securing good electrical engagement of the pin terminals 17. FIG. 1A shows another connection technique wherein an alternative contact strip 25 includes parallel spaced members 26 which are forcedly separated to accept the inserted pin terminal such as a diode-type pin terminal 29 having a diode shown mounted at 30. The contact strips 25 are interconnected by transverse rib members 27 spaced apart to permit the acceptance of the pin terminal 29.

As is generally understood, the pinboard matrix assembly 10 comprises a type of programming device which is susceptible of being manually programmed by patching a desired pattern of electrical crosspoint connections through selective insertions and/or removals of the pin terminals 17 or 29. The programming capabilities of such matrix assemblies 10 are indeed very flexible and offer a number of patchable connection combinations limited only by the crosspoint array size of the selected matrix assembly 10. Larger array sizes can be constructed by multiplication of the basic array size onto a common foundation substrate and it is these larger array crosspoint constructions which are popular to communication switching systems, and in particular, to telephone switching systems. In main equipment frames of telephone offices, equipment racks contain rows of side by side stacked files of circuit and/or component mounting cards. Where it is possible to reduce the numbers and size of such cards and/pr the spacing required between such cards, a considerable savings can be realized. It is this latter area which is the primary concern of the novel features of the present invention wherein the access height dimension of the matrix assemblies 10 and the insertable pin terminals 17 and 29 cause adjacent cards to be spaced apart by several vacant card slots. It is the intention of the Applicant to provide a design for an *x* and *y* coordinate crosspoint matrix which provides considerable space savings through utilizing special miniaturized mated connector apparatus.

The Applicant's invention finds particular application in telephone switching systems because most crosspoint matrix configurations utilize only a two conductor crosspoint, and the spaced *x* and *y* contact strips can be accommodated on opposite flat surfaces of a single thickness substrate such as the card substrate 40 in FIG. 2. FIG. 2 shows the type of card substrate 40 which is slidably mounted in closely spaced card slots within card files of equipment frames (not shown). Now considering FIGS. 2 and 3, there is shown an improved construction whereby a first flat surface 40*a* of the card substrate 40 is provided with a plurality of spaced conductor paths or contact strips 41*a* – 41*c*, 41*n* as well as others to extend likewise across the card 40 that are not shown. A second flat surface 40*b* of the card 40 is provided with another plurality of spaced conductor paths or contact strips 43*a* – 43*c*, 43*n* as well as others to extend likewise across the card 40 that are not shown, the contact strips 41*a* – 41*c* and 43*a* – 43*c* being arranged in the familiar *x* and *y* coordinate cross pattern.

There is shown in FIG. 2 a mated connector apparatus 50 comprised of socket means 51 and a removable pluggable connector means 53. The socket means 51 is permanently mounted within preformed openings 55 in the card 40 for communicating between the opposed conductors such as 41*n* and 43*n*, FIG. 3. In the manner of interconnection for the mated conductor apparatus 50, the pluggable connector means 53 is inserted over an exposed section of an associated one of the socket means 51 and further has a protruding portion thereof engulfed by the socket means 51. The mated connector apparatus 50 is designed to permit patching and is significantly smaller in size than the prior art pin terminals 17 and 29, as is shown by the drawing. The size of the pluggable connector means 53 is seen to be only so large as to accommodate a component such as a diode 57, and for a relative size comparison see component 30 mounted in the pin terminal 29.

Now considering the details of the preferred embodiment, for the socket means 51, there is provided a pair of coaxial conductor sleeves comprising an inner or interior sleeve portion 61 and an outer or exterior sleeve portion 66. The inner sleeve portion 61 is generally elongated having an extension or prong member 61a adapted to extend through the thickness dimension of the card 40 for electrical engagement with the contact strip 43*n*. After all such connections have been made between the prong members 61 and their associated contact strips, a wave soldering step could be used to apply solder to the connections for securing firm electrical continuity. Oppositely disposed from the prong member 61a is a slightly enlarged bell-shaped sleeve portion 61*b* which includes at least a pair of blade-like tines 62 depending inwardly of the bell portion 61*b* for the purpose of enhancing electrical engagement with the pluggable connector means 53 in the manner described hereinafter. The outer sleeve 66 is preferably insulated from electrical continuity with the inner sleeve 61 by the insulating material ring 64. The height of the standoff of the outer sleeve 66 from the surface 40*a* is variable and depends primarily on the capability of the pluggable connector means 53 to make a firm and sure mechanical and electrical engagement with the outer sleeve 66 of the socket means 51.

Now referring primarily to FIGS. 3 and 4, the pluggable connector means 53 is comprised of a pair of coaxial conductors including an inner conductor which is equivalent to the diode 57 and an outer conductor 59 in the form of a conductor sleeve. That is to say with respect to the inner conductor, the diode 57 serves in the capacity of an inner conductor. However, for the configuration of a direct shorting pin terminal, a jacket similar to cover jacket 69 shown in FIG. 4 or a solid wire would be provided to extend the full length of the outer conductor 49 and to be electrically connected at the opposite and exterior end portion thereof. The diode 57 includes a first lead wire 71 and a second lead wire 73 which has been shortened with respect to the longer lead wire 71. The diode is housed within the inner confines of the outer conductor 59. One end portion 59*a* of the outer conductor 59 comprises a reduced diameter portion for engaging the shorter lead wire 73 for providing electrical contact and mechanical support therewith. The diode 57 is positioned within the interior space of the outer conductor 59 by an insulating washer 77 which as an outside diameter substantially equal to the inside diameter of the outer conductor 59 and has an inside diameter substantially equal to the outside diameter or dimension of the insertable lead wire 71. The protective conductive jacket 69 is optional and is provided over the lead wire 71 for stiffening the lead wire of the component where required.

The longer lead wire 71 is intended to extend beyond the length of the outer conductor 53 and to be pluggably received within the bell portion 61*b* of the socket means 51. As earlier stated, the tines 62 make contact with the lead wire 71 or the conductive jacket 69 whereby a continuous electrical connection is made from the contact strip 41*n*, the outer conductor sleeve 66, the outer conductor 59, through the diode 57, the inner sleeve 61 to the contact strip 43*n*. If desired, the outer conductor 59 can be provided with longitudinally extending openings which define a serrated end portion 59*b*, whereby the serrated portions act as fingers to expand over the outer conductor sleeve 66 for obvious advantages. Also, the reduced diameter end portion 59*a* is then enlarged into a flange member 59*c* which serves as handle means in facilitating the use of the pluggable connector means 53.

It is apparent that other types of components could also be mounted within the pluggable connector means 53 and if such components did not have connecting lead wires, the same could easily be provided. The materials required for constructing the mated connector apparatus 50 have not been specified as it is obvious that conductive materials must be used and a wide variety of suitable materials are known to be useful. It is to be understood that while the present invention has been shown and described with reference to the preferred embodiments thereof, the invention is not limited to the precise forms set forth, and that various modifications and changes may be made therein without departing from the spirit and scope of the present invention.

What is claimed is:

1. In a file of double-sided pinboard matrix cards stacked in closely adjacent side by side arrays, a pinboard matrix card including two matrices of separate circuit paths disposed oppositely on the two side of said matrix card, respectively, a plurality of apertures in said matrix card extending between said two sides to provide a plurality of crosspoints between said two matrices of circuit paths, and mated connector apparatus comprising a plurality of socket means mountable in selected ones of said plurality of apertures and a plurality of pluggable connector means mountable in selected ones of said plurality of socket means, the improvement comprising at least a pair of coaxial conductor sleeves for each of said socket means including an inner sleeve to be extended through said pinboard matrix card for electrically connecting with a selected circuit path of one of said two matrices of circuit paths and having an outer sleeve for electrically connecting with an oppositely disposed circuit path of the other of said two matrices of circuit paths, and at least a pair of coaxial conductors for each of said pluggable connector means, said pair of coaxial conductors being electrically interconnected and having an inner conductor pluggable within the inner sleeve of said selected socket means for electrically connecting with said selected circuit path of said one matrix of circuit paths and further having an outer conductor engageable with the outer sleeve of said socket means for electrically connecting with said oppositely disposed circuit path of said other matrix of circuit paths at said crosspoint whereby said socket means and said connector means cooperate to provide a plurality of electrical crosspoints between said matrices of circuit paths.

2. The mated connector apparatus of claim 1 wherein said inner sleeve of said socket means includes contact means at its end portion opposite from said extended end portion for making electrical contact with said inner conductor upon insertion thereof.

3. The mated connector apparatus of claim 2 wherein said contact means of said inner sleeve of said selected socket means comprises a plurality of interiorly depending spring like tines which yield to the insertional movement of said conductor.

4. The mated connector apparatus of claim 1 wherein said pluggable connector means provides for the electrical interconnection of said inner and outer conductors at the end portion opposite from the pluggable connection with said inner sleeve, a preselected discrete electrical component having oppositely disposed terminal means is positioned within said outer conductor with one of said terminal means electrically engaging said electrical interconnection between said inner and outer conductors of said pluggable connector means, and the other of said terminal means electrically engaging said inner conductor.

5. The mated connector apparatus of claim 4 wherein said oppositely extending terminal means of said discrete component comprises a pair of oppositely extending terminal wires and the other of said terminal wires comprises said pluggable inner conductor.

6. The mated connector apparatus of claim 4 wherein said end portion of said pluggable connector means which includes an electrical interconnection is provided with handle means for facilitating the handling of said pluggable connector means.

7. The mated connector apparatus of claim 6 wherein said outer conductor of said pluggable connector means engages said outer sleeve of said socket means through receiving substantially all of said outer sleeve within said outer conductor, and said outer conductor includes longitudinally extending apertures for providing diametrical flexibility to said outer conductor when said outer sleeve is so received.

8. A mated connector apparatus for pluggable electrical interconnection comprising socket means including a pair of coaxial conductor sleeves in the form of an inner sleeve and an outer sleeve, said inner sleeve being electrically isolated from said outer sleeve and extending lengthwise outwardly from one end portion of said outer sleeve to provide a first pluggable member whereby said socket means is pluggable with respect to a suitable apertured mounting substrate, and further comprising pluggable connector means in the form of an inner conductor and an outer conductor, said outer conductor being telescopically received over said outer sleeve of said socket means to provide electrical interconnection therewith and being electrically connected to said inner conductor, and said inner conductor providing a second pluggable member for being telescopically received within said inner sleeve of said socket means whereby said pluggable connector means is pluggable with respect to said socket means.

9. The mated connector apparatus of claim 8 wherein said pluggable connector means includes an interiorly mounted discrete electrical component having oppositely disposed terminal means engaged by said inner conductor and said outer conductor, respectively.

10. An assembly of mated connector apparatus for use in selectively interconnecting first circuit paths with second circuit paths, said first and second circuit paths disposed on opposite flat sides of a two-sided apertured mounting substrate, respectively, said assembly comprising a plurality of socket means mountable in the apertures of said substrate, each of said socket means including an outer sleeve selectively engageable with one of said second circuit paths and an inner sleeve coaxially disposed with respect to said outer sleeve and extending lengthwise outwardly with respect to said outer sleeve for communicating through said apertures to selectively engage with one of said first circuit paths, said assembly further comprising a plurality of pluggable connector means mountable to said socket means, each of said pluggable connector means including an outer conductor having a first open end portion for telescopically receiving said outer sleeve therein and further including an inner conductor coaxially disposed with respect to said outer conductor and having one end portion thereof connected with said outer conductor and an opposite end portion to be telescopically received within said inner sleeve of an associated one of said socket means whereby an electrical interconnection is made between said first and second circuit paths when said pluggable connector means is connected to a selected one of said socket means.

* * * * *